J. H. RUSSELL.
GOVERNOR.
APPLICATION FILED MAY 26, 1913.

1,094,023.

Patented Apr. 21, 1914.
2 SHEETS—SHEET 2.

WITNESSES
David R. Wagner
H. T. Chapman.

J. H. Russell
INVENTOR

BY E. G. Siggers
ATTORNEY

UNITED STATES PATENT OFFICE.

JOSEPH HENRY RUSSELL, OF LAPORTE, INDIANA.

GOVERNOR.

1,094,023.

Specification of Letters Patent. Patented Apr. 21, 1914.

Application filed May 28, 1913. Serial No. 769,915.

*To all whom it may concern:*

Be it known that I, JOSEPH H. RUSSELL, a citizen of the United States, residing at Laporte, in the county of Laporte and State of Indiana, have invented a new and useful Governor, of which the following is a specification.

This invention has reference to improvements in governors, and its object is to provide a governor by which various degrees of speed may be obtained while the governor is in operation.

In accordance with the present invention there is provided a centrifugal governor for steam or explosion engines or any moving structure where governors are applicable, and instead of varying the tension or compression of a spring the present invention provides means whereby the degree of leverage exerted by the momentum responsive members of the governor upon a spring of constant power may be varied so that even though the governor balls, as they may be termed, shall travel to the same extent, the degree of movement of the parts controlled by the governor balls will vary in accordance with the set of the governor or its leverage, wherefore the speed is readily controlled. The governor may be of the centrifugal type with the governor balls or weights acting against a spring or springs and carried by levers mounted upon movable fulcrums which in turn are under the control of mechanism whereby these fulcrums may be adjusted with respect to the parts controlled by the governor balls to increase or decrease the leverage of the governor balls, and, therefore, the throw of the controlled member to different extents even though the governor balls have the same extent of movement under the different speeds.

The invention will be best understood from a consideration of the following detailed description, taken in connection with the accompanying drawings forming a part of this specification, with the further understanding that while the drawings show a practical form of the invention the latter is not confined to any strict conformity with the showing of the drawings, but may be changed and modified so long as such changes and modifications mark no material departure from the salient features of the invention.

Figure 1:
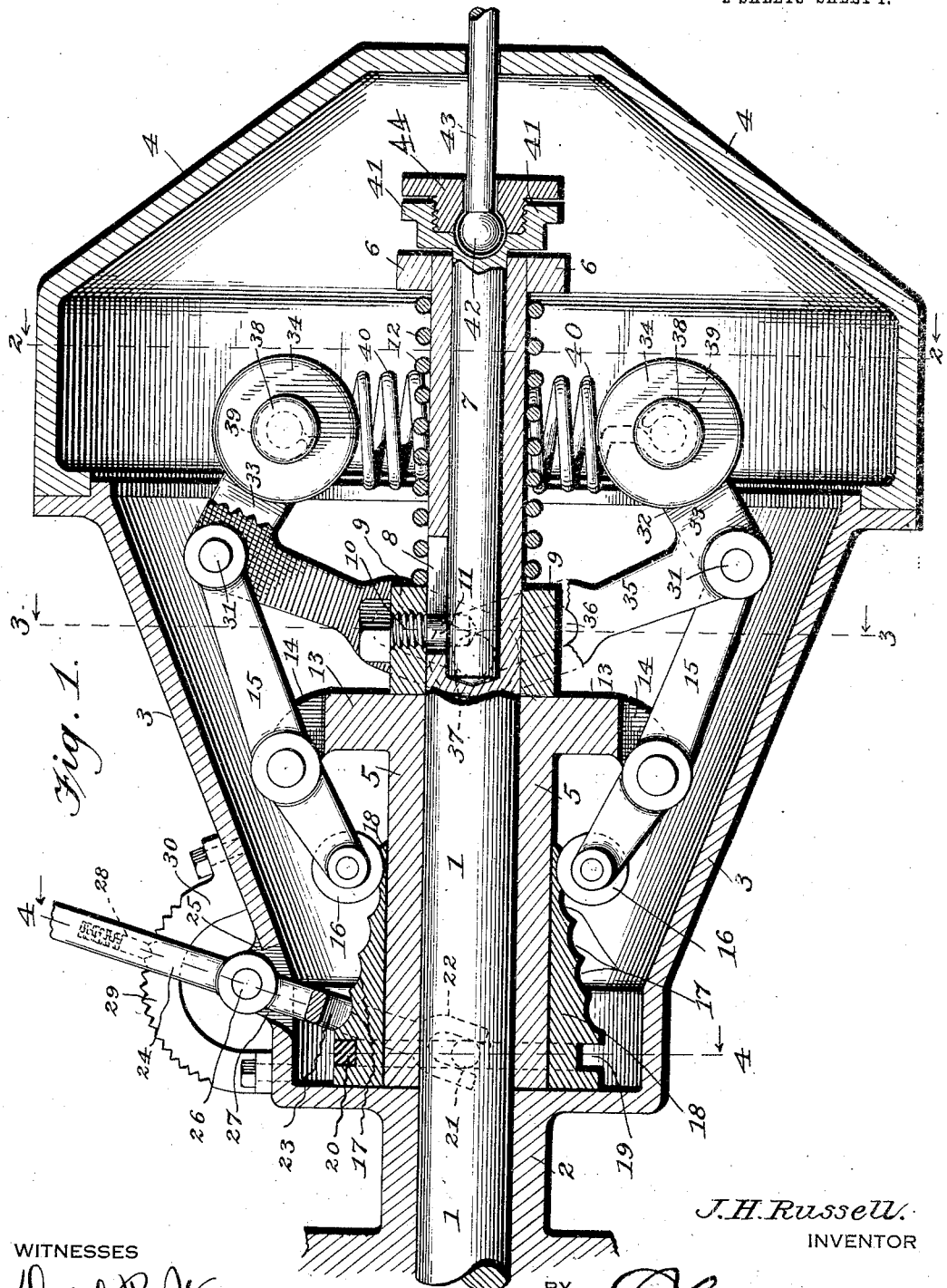
Figure 2:
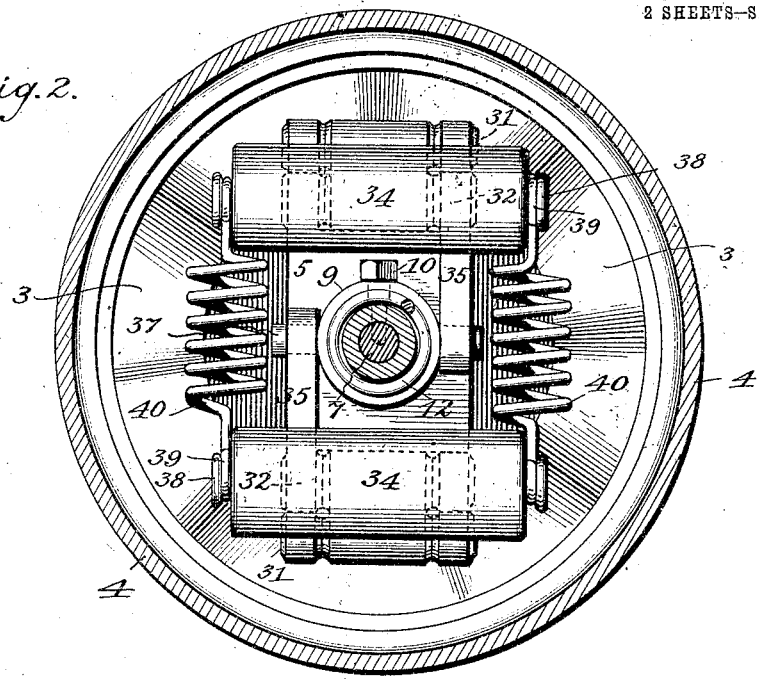
Figure 3:
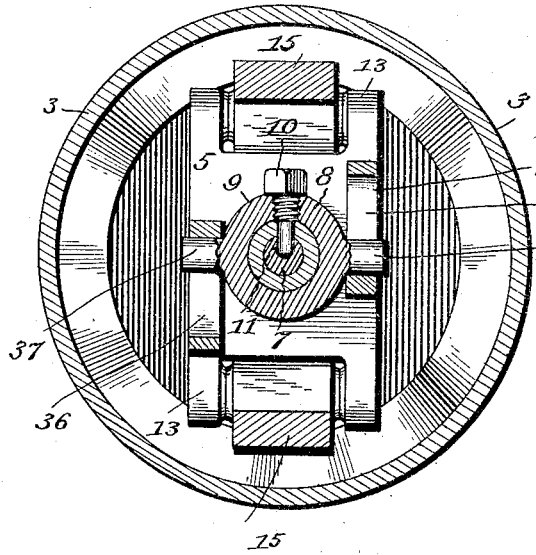
Figure 4:
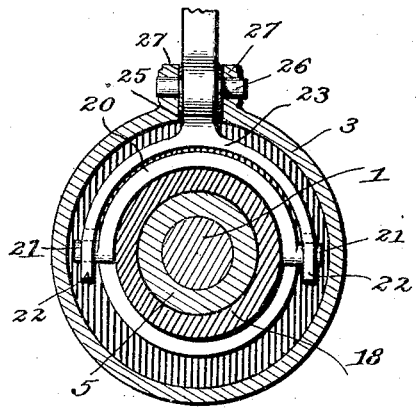

In the drawings:—Figure 1 is a diametric longitudinal section of a governor constructed in accordance with the present invention, some parts being shown in elevation. Fig. 2 is a section on the line 2—2 of Fig. 1 but drawn on a smaller scale. Fig. 3 is a section on the line 3—3 of Fig. 1 and drawn on the same scale as Fig. 2 and also omitting some distant parts. Fig. 4 is a section on the line 4—4 of Fig. 1 on the same scale as Figs. 2 and 3 and omitting distant parts.

Referring to the drawings there is shown a shaft 1 mounted in bearings 2 which may be formed at one end of a casing 3, this casing having a cap member 4 remote from the bearings 2. Said casing with its cap member provides a closure or container for certain parts of the structure protecting the same from contact and dust or dirt. The shaft 1 extends longitudinally of the casing 3 in the line of its axis and carries within the casing a sleeve 5 made fast to the shaft for rotating therewith. The shaft extends wholly through the casing 3 and into the cap 4 where it terminates in a radial flange 6 which is formed on or made fast to the shaft 1, while entering the end of the shaft surrounded by the flange 6 in an axial direction is a spindle 7 of a length to extend nearly to the corresponding end of the sleeve 5 which latter terminates within the casing 3, and adjacent the inner end of the spindle 7 the shaft 1 is provided with an axially elongated radial slot 8.

Surrounding the shaft 1 where provided with the slot 8 is a collar 9 through which there is passed a set screw 10 having an extension 11 traversing the slot 8 and entering the spindle 7 near the inner end thereof, so that the collar 9 and spindle 7 are connected together for simultaneous movement to an extent limited by the length of the slot 8. Between the collar 9 and the flange 6 the shaft is surrounded by a spring 12 tending at all times to hold the collar 9 against the corresponding end of the sleeve 5, but the collar is capable of movement away from the sleeve 5 in a direction to compress the spring 12.

That end of the sleeve 5 against which the collar 9 abuts is provided on opposite sides with radially extended arms 13, terminating in forked extremities 14 in which are pivotally supported or fulcrumed levers 15 shown as of the first order. Each lever has at one end, which in the particular showing of the drawing is at the end of the shorter arm, a roller 16 adapted to any one of a stepped series of recesses 17 in a conical sleeve 18 mounted on the sleeve 5 to move lengthwise thereof, the conical sleeve 18 having a circumferential groove 19 near its shorter end, on which groove there is seated a yoke 20 having radially projecting pins 21 at opposite ends, these pins being straddled by bifurcated extremities 22 of a fork 23 having a handle member 24 extended through a passage 25 in the casing 3 near the bearing 2 and where extending through the passage 25 the arm 24 is traversed by a pivot pin 26 engaging ears 27 at the sides of the passage 25. The arm 24 carries a thumb latch 28 adapted to engage the notches 29 in a rack segment 30 fast to the exterior of the casing 3.

At the end of each lever 15 remote from the roller 16 there is mounted by a pivot pin 31 an angle lever 32 having one arm 33 terminating in a weight or enlargement 34 shown as cylindrical. The lever 32 has another arm 35 at a sufficient distance to one side of the center line of the weight 34 to in turn extend to one side of the collar 9 and the free extremity of the arm 35 is formed with a longitudinally elongated slot 36 entered by a trunnion 37 extending radially from the corresponding side of the collar 9. The arm 35 of one angle lever 32 is located to one side of the collar 9 and the corresponding arm of the other lever 32 is located on the other side of the collar 9, so that these two arms in effect embrace the collar 9. Each end of each weight 32 is formed with a headed extension 38 receiving an eye 39 on the corresponding end of a spring 40, there being two springs 40 each located at a respective end of the weight 34, which latter is long enough to permit the springs 40 to avoid engagement of these springs on opposite sides of the spring 12.

That end of the spindle 7 remote from the end engaged by the pin extension 11 projects beyond the corresponding end of the shaft 1 and is there formed with a laterally expanded head 41 hollowed centrally to receive a ball 42 at one end of a rod 43 extending axially through the cap 4. The ball end of the rod 43 is held to the head 41 by a nut 44 also suitably hollowed to conform to the ball 42, so that the rod 43 may be made fast to some non-rotative part, while a spindle 7 rotates with the shaft 1 because of its connection therewith by means of the set screw 10, but the rod 43 may move lengthwise a corresponding movement of the spindle 7.

Let it be assumed that the shaft 1 is suitably connected up to a moving part of the engine or other structure to be governed to have a speed corresponding to the speed of the moving structures, and let it be assumed that the rod 43 is connected to a throttle valve or carbureter or other structure, the governing of which will result in a governing of the movable structure. In the position of the parts shown in Fig. 1 it may be assumed that the device is set for the maximum speed desired. If, now, this speed be exceeded for any reason, as by a sudden throwing off of load, or an increase in steam pressure in case of a steam engine, or for any reason, then the weights 34 will move outwardly under the accelerated speed against the normal tendency of the springs 40 and this movement of the weights will cause a movement of the levers 32 in a direction to carry the arms 35 away from the sleeve 5, this movement being communicated through the slotted ends 36 of the arms 35 to the trunnions 37 and by the latter to the collar 9, thereby compressing the spring 12 until the combined resistance of the springs 40 and spring 12 is sufficient to balance the centrifugal force acting upon the weights 34, but this movement is participated in by the spindle 7 and rod 43, causing such a movement of the throttle valve or adjustment of the carbureter or adjustment of whatever part is controlled by the rod 43 to cause a corresponding reduction in the steam supply or in fuel or other means of causing power that the moving structure be governed receiving less power than formerly will decrease in speed until the requisite balance is established and the acceleration in speed is arrested or overcome. Under these conditions the governor acts similarly to other governors. If now the conical sleeve be moved in a direction away from the bearing 2 the rollers 16 will move from one recess 17 to the next one in order, or to some succeeding one if the movement be great enough. Assuming the parts to be in the position shown in Fig. 1 then a movement of the sleeve 18 toward the right will cause a spreading apart of the roller ends of the levers 15 and an approach of the pivots 31, so that the arms 35 move one toward the other with relation to the axis of the trunnions 37, thus shortening the effective lengths of these arms 35, wherefore a certain movement of the weights 34 one away from the other under the action of centrifugal force will cause a lesser movement of the spindle 7 and rod 43 than under the conditions first assumed. Moreover, the approach of the pivots 31 causes a commensurate approach of the weights 34 and the spring 40 become more retracted than before and hence are under less tension, so that the weights 34 will fly outwardly more readily and under the action of less speed than under the first assumption. The governing therefore is accomplished at a lesser speed than in the first instance, all other things being equal, and the engine or other moving part will run at a slower speed and maintain such slower speed.

By having several steps in the conical sleeve 18 quite a range of different speeds is possible and by having the notches 29 in the segment 30 properly spaced, an operator may readily set the governor to respond to different chosen speeds.

With the present invention the tension of the spring 12 is not changed except as acted upon by the collar 9, but the tension of the springs 40 is automatically changed by the adjustment of the levers carrying the weights 34 and the leverage of these levers is also changed by the adjustment of their fulcrums, such adjustment varying the effective lengths of one of the arms of each lever, this being the longer arm in the particular structure shown, but if the respective lengths of the arms of the levers 32 were reversed, then it would be the effective length of the shorter arm of each lever that is changed by the adjustment of the pivots or fulcrums.

What is claimed is:—

1. A centrifugal governor provided with weights responsive to centrifugal force, a connection to the part to be controlled by the governor, a lever for each weight carrying the said weight and in turn connected to the connection to the part to be controlled, and means for varying, at will, the effective length of one arm of each lever.

2. A centrifugal governor provided with weights responsive to centrifugal force, a connection to the part to be controlled by the governor, lever connections between the weights and the connection to the part to be controlled, fulcrum supports for the levers, and means for adjusting the fulcrum supports to vary the effective length of one arm of each lever.

3. A centrifugal governor provided with weights responsive to centrifugal force, levers each carrying a weight, a connection between the levers and the part to be controlled by the governor, and adjustable fulcrum supports for the levers for varying the effective length of the arm of each lever extending from the fulcrum to the connection to the part to be governed.

4. A centrifugal governor provided with weights responsive to centrifugal force, an angle lever for each weight, a connection between that end of each lever remote from the weight and the part to be controlled by th governor, and an adjustable fulcrum support connected to the angle of each lever to vary the effective length of the arm of the lever extending from the fulcrum support to the connection of the part to be governed.

5. A centrifugal governor provided with weights responsive to centrifugal force, spring connections between the weights, an angle lever individual to and carrying each weight, said angle lever having the end remote from the weight longitudinally slotted, a slidable connection to the part to be governed provided with a pin connection with the slotted end of each lever, and an adjustable fulcrum support for each lever connected thereto at the angle of said lever.

6. A governor comprising a rotatable shaft, a spindle entering one end of the shaft and provided with a connection to the part to be governed, the shaft being provided with a longitudinal slot within the length of the spindle, a collar mounted on the shaft and connected to the spindle through the slot, a spring on the shaft acting on the collar to move it lengthwise of the shaft, a sleeve mounted on the shaft and provided with fulcrum supports, levers mounted on the fulcrum supports each with one end in overhanging relation to the portion of the shaft carrying the collar, an angle lever carried by the overhanging end of each of the first named levers, said angle lever having a weight at one end and at the other end longitudinally slotted and the collar being provided with pins or trunnions extending through the slots in the second named levers, spring connections between the weights, and a conical sleeve mounted on the first named sleeve and provided with means for moving it lengthwise of the first named sleeve to adjust the first named levers to vary the effective length of the slotted arms of the angle levers carrying the weights.

7. A centrifugal governor provided with weights, levers carrying the weights, connections controlled by the levers and extending to the part to be governed, other levers carrying the first-named levers and serving as adjustable fulcrum supports therefor, and a conical member engaging the second-named levers at the ends thereof remote from those carrying the first-named levers for causing an approach or recession of the fulcrums of the first-named levers.

8. A centrifugal governor provided with weights, levers carrying the weights, connections controlled by the levers and extending to the part to be governed, other levers carrying the first-named levers and serving as adjustable fulcrum supports therefor, and a conical member engaging the second-named levers at the ends thereof remote from those carrying the first-named levers for causing an approach or recession of the fulcrums of the first-named levers, said conical member having longitudinally spaced seats or recesses engaging the second named levers at predetermined points of adjustment of the conical member.

In testimony, that I claim the foregoing as my own, I have hereto affixed my signature in the presence of two witnesses.

JOSEPH HENRY RUSSELL.

Witnesses:
 Louis H. Leist,
 Floyd R. Blanchod.